United States Patent [19]
Bouvier

[11] Patent Number: 6,078,512
[45] Date of Patent: Jun. 20, 2000

[54] VOLTAGE RECTIFYING DEVICE WITH INTEGRATED COMPONENTS

[75] Inventor: Jacky Bouvier, Meylan, France

[73] Assignee: France Telecom, Paris, France

[21] Appl. No.: 09/117,471

[22] PCT Filed: Nov. 27, 1997

[86] PCT No.: PCT/FR97/02132

§ 371 Date: Jul. 28, 1998

§ 102(e) Date: Jul. 28, 1998

[87] PCT Pub. No.: WO98/24172

PCT Pub. Date: Jun. 4, 1998

[30] Foreign Application Priority Data

Nov. 29, 1996 [FR] France .................................. 96 14705

[51] Int. Cl.[7] ................................................ H02M 7/217
[52] U.S. Cl. ............................................................ 363/127
[58] Field of Search ................................. 363/125, 126, 363/127

[56] References Cited

U.S. PATENT DOCUMENTS

| | | |
|---|---|---|
| 4,139,880 | 2/1979 | Ulmer et al. . |
| 4,875,151 | 10/1989 | Ellsworth et al. ....................... 363/127 |
| 5,173,849 | 12/1992 | Brooks ..................................... 363/127 |
| 5,479,172 | 12/1995 | Smith et al. . |

FOREIGN PATENT DOCUMENTS

| | | |
|---|---|---|
| 0 052 860 | 6/1982 | European Pat. Off. . |
| 96/28879 | 9/1996 | WIPO . |

OTHER PUBLICATIONS

Patent Abstracts of Japan, Publication No. 63003655, published Jan. 8, 1988 (1 page).

Patent Abstracts of Japan, Publication No. 63064572, published Mar. 23, 1988 (1 page).

Maleis, United States Statutory Invention Registration No. H64, published May 6, 1986 (4 pages).

Primary Examiner—Adolf Deneke Berhano
Attorney, Agent, or Firm—Conley, Rose & Tayon, PC

[57] ABSTRACT

In one embodiment, the voltage rectifying device includes two input terminals for an AC voltage, rectifying means made using integrated technology within a semiconductor substrate, and two output terminals for a rectified voltage, one of these output terminals being taken out at substrate level. The rectifying means may include a pair of first insulated-gate field-effect transistors connected as diodes with one of their electrodes linked to the substrate, and a pair of second insulated-gate field-effect transistors arranged respectively in biased semiconductor wells with the gates linked and crossed over the two input terminals, the first and second transistors having channels of opposite types and a drain/source voltage when conducting which is below a predetermined voltage.

19 Claims, 3 Drawing Sheets

VOLTAGE RECTIFYING DEVICE WITH INTEGRATED COMPONENTS

BACKGROUND OF THE INVENTION

1. Field of the Invention

The invention may find an advantageous but nonlimiting application in the field of portable objects which are capable, during remote cooperation with a terminal, of recovering energy, for example from the magnetic field generated by the terminal, and to do so for frequencies which may range from about a hundred kHz to several tens of MHz.

2. Description of the Related Art

The statutory registration of invention in the United States No. H64 published on May 6, 1986 discloses a full-wave rectifier made using integrated technology having two N-channel insulated-gate field-effect transistors (NMOS transistor) and two diodes. However, such a rectifier exhibits operating problems when the frequency of the AC input voltage exceeds a few hundred kHz because of the poor switching characteristics of the diodes.

U.S. Pat. No. 5,479,172 describes a rectifier comprising four NMOS transistors, two of which are diode-connected. The major drawback of this rectifier lies in the magnitude of the drop voltage, that is to say the difference between the input voltage and the output voltage across the terminals of the rectifier.

SUMMARY OF THE INVENTION

The invention aims to afford a solution to these problems.

The invention is aimed in particular at solving the problem of the switching time of the diodes while minimizing the drop voltage, so as in particular to allow correct operation at high frequency.

In one embodiment a voltage rectifying device includes two input terminals for an AC voltage, rectifying means made using integrated technology within a semiconductor substrate, and two output terminals for a rectified voltage, one of these output terminals being taken out at substrate level.

In an embodiment, the rectifying means includes a pair of first insulated-gate field-effect transistors arranged so as to operate as rectifier elements, with one of their electrodes, drain or source, linked to the substrate, and a pair of second insulated-gate field-effect transistors arranged respectively in biased semiconductor wells with the gates linked and crossed over the two input terminals, the first and second transistors having channels of opposite types and a drain/source voltage when conducting which is below a predetermined voltage.

If the first transistors, for example NMOS transistors, exhibit a sufficient channel width for the gate/source voltage to remain below, when conducting, the said predetermined voltage, in this instance the threshold voltage of a diode, the rectifier-like arrangement of these transistors can be produced simply by diode-connecting these transistors, that is to say by linking the gate to one of their electrodes, for example the drain. In such an embodiment, providing for the first transistors to have their drains linked to the substrate and their gates linked to their respective drains, the diode-connected sources of these two first transistors are linked to the two input terminals of the voltage rectifying device respectively.

The fact that the drain/source voltage (or gate/source voltage since the gate is linked to the drain) is below, when conducting, the threshold voltage of the source/substrate stray diode, contributes to the proper operation of the rectifier by effectively shunting this diffusion diode, which in other words prevents some of the current from flowing through this stray diode.

If the technology used does not make it possible to obtain gate/source voltages while conducting which are small enough for a reasonable width of the transistors, the rectifier-like arrangement of the first transistors may be achieved by linking one of the electrodes, drain or source, of the first transistors to the substrate and by linking the gates of these first transistors to a chosen bias voltage which is advantageously below the intrinsic threshold voltage of each first transistor (that is to say the threshold voltage of the transistor for a source/substrate voltage of 0 volts) so that these remain sufficiently blocked during the periods of nonconduction.

In practice, especially when the rectifying means are made using 1 micron CMOS integrated technology (1 micron designating the length of the channels of the transistors), or even 0.5 micron CMOS technology, the bias voltage is chosen to lie between a few hundred millivolts, for example 400 millivolts, and an upper limit equal to the intrinsic threshold voltage of the transistor, reduced by a few hundred millivolts, for example 400 millivolts.

The use of transistors connected as rectifier elements instead of conventional diodes may make it possible to operate the rectifier correctly even at high frequencies, for example a few tens of MHz. Moreover, since one of the electrodes of these first transistors (the drain for example) is linked to the substrate, and since the potential of the other electrode (source for example) is negative with respect to that of the substrate during the periods of conduction, the drop voltage is minimized by minimizing an effect which is well known to the person skilled in the art by the name of the "substrate effect".

As far as the second transistors are concerned, for example PMOS transistors, the fact that their conduction-mode drain/source voltage is below a predetermined voltage, advantageously taken equal to a threshold voltage of a oiode, for example 0.7 volts, and in practice 0.6 volts, especially when the rectifying means are made using 1 micron, or even 0.5 micron, CMOS integrated technology, may make it possible always to preserve the blocking of the vertical PNP stray transistors resulting from such a structure, thus contributing to the good efficiency of the rectifier.

Furthermore, by biasing the semiconductor wells containing these second transistors, for example by linking them to the other output terminal, effects of latch-up of these transistors while conducting between the well and the substrate may be prevented.

BRIEF DESCRIPTION OF THE DRAWINGS

Other advantages and characteristics of the invention will emerge on examining entirely nonlimiting embodiments and the appended drawings in which.

DETAILED DESCRIPTION OF THE INVENTION

Figure 1:
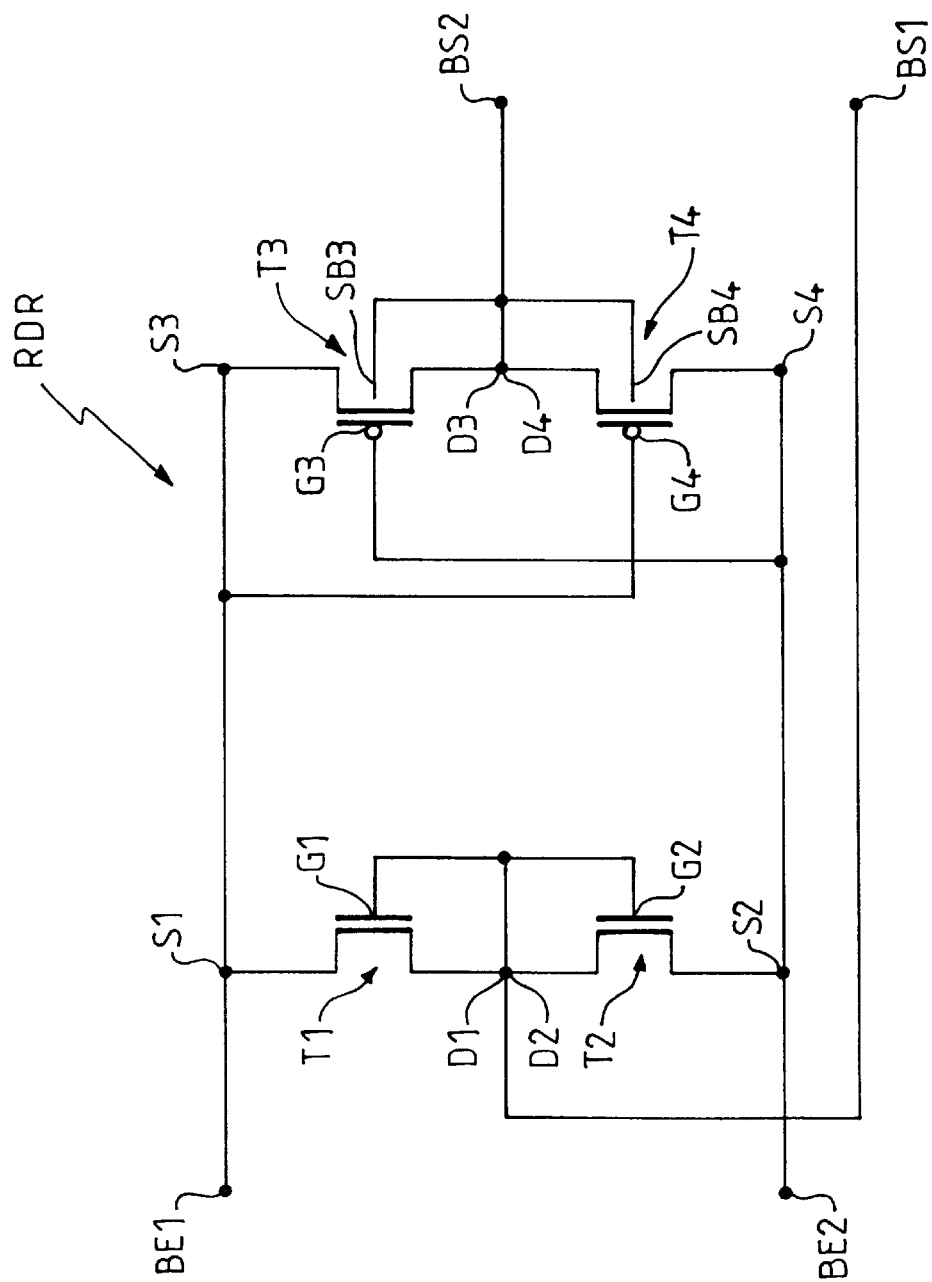
FIG. 1 illustrates diagrammatically a first embodiment of a rectifier.

In FIG. 1, the reference RDR denotes overall a first embodiment of a full-wave rectifier.

This rectifier includes two input terminals BE1 and BE2 for receiving an AC signal (square, sinusoidal or of any other shape) and two output terminals BS1 and BS2 for delivering a rectified DC signal.

One of these output terminals, for example the terminal BS1 is taken out at the level of the semiconductor substrate SBS (FIG. 2) within which the rectifier is made.

Provided between the input terminals and the output terminals are rectifying means comprising a pair of first insulated-gate field-effect transistors referenced T1 and T2 respectively, and a pair of second insulated-gate field-effect transistors referenced T3 and T4 respectively.

In the remainder of the description, as far as the insulated-gate field-effect transistors are concerned, for the purposes of simplification the electrodes of the transistors other than the gate have been differentiated by using the terms source and drain. Nevertheless, the person skilled in the art is aware that in this type of technology the transistors are made symmetrically as regards the behavior of their two source and drain electrodes, so that the descriptions source and drain could without difficulty be interchanged.

In the set-up of FIG. 1, the two transistors T1 and T2 have their respective sources S1 and S2 linked to the two input terminals BE1 and BE2. Furthermore, these transistors are diode-connected, that is to say they have their other electrode, namely their drains D1, D2 linked to the gates G1 and G2 respectively.

Moreover, the two drains D1 and D2, and consequently the two gates G1 and G2, are linked directly to the output terminal BS1, that is to say are linked to the semiconductor substrate.

Whereas this pair of first transistors is formed from NMOS transistors, the pair of second transistors T3 and T4 is formed from PMOS transistors.

These second transistors have their respective gates G3 and G4 linked and crossed over the two input terminals BE2 and BE1. The source S3 of the transistor T3 is moreover linked to the input terminal BE1, whereas the source S4 of the transistor T4 is linked to the input terminal BE2 and the drains D3 and D4 are together linked to the second output terminal BS2.

Figure 2:
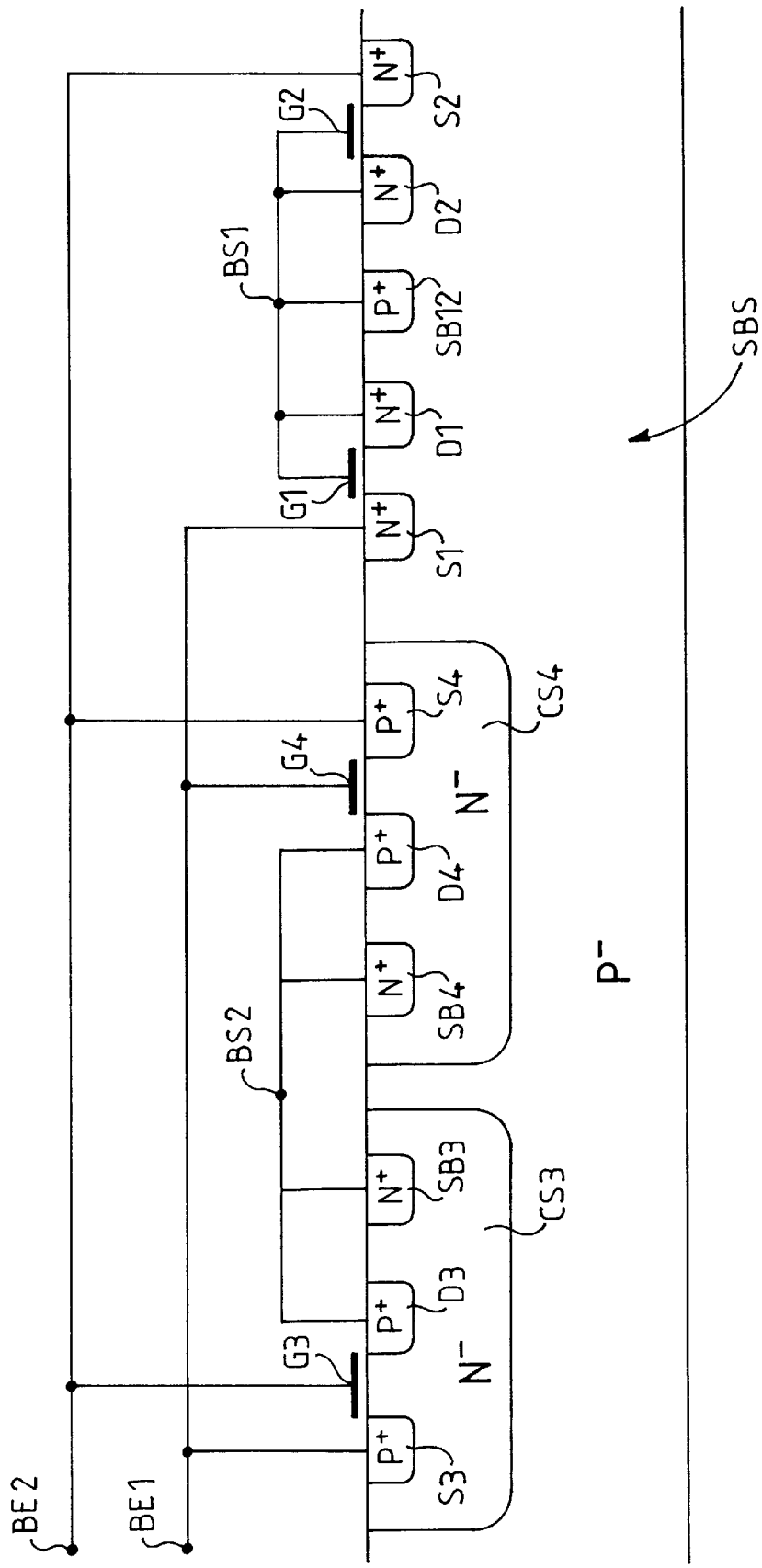
FIG. 2 illustrates diagrammatically the embodying of the device of FIG. 1 using integrated technology.

As may be seen more particularly in FIG. 2, these two transistors 3 and T4 are arranged respectively in two semiconductor wells CS3 and CS4, here N⁻-doped semiconductor wells. The substrates of these two transistors are biased and linked to the output terminal BS2 via an N⁺-overdoped substrate region (or well region) referenced SB3 for the transistor T3, and SB4 for the transistor T4.

As may moreover be seen in this FIG. 2, the first output terminal BS1 is linked to the semiconductor substrate SBS, P⁻-doped in the present case, via a P⁺-overdoped substrate region SB12.

The drain/source voltage of each of the transistors T3 and T4 when conducting is below the threshold voltage of the base/emitter diode of the stray vertical PNP transistor resulting from the structure described, and is so in such a way that this stray transistor is always kept blocked.

The person skilled in the art, who is aware that the drain/source voltage of a transistor when conducting depends on the ratio W/L (where W denotes the width of the channel and L the length of the channel, that is to say the drain/source distance), on the value of the conduction current and on parameters related to the technology employed, will readily be able to dimension the transistors, T3 and T4 in such a way as to comply with this condition. In practice, a conduction-mode drain/source voltage of below 0.6 volts will preferably be chosen. This can be obtained by using transistors with a channel width of around 500 microns for instantaneous currents of the order of a milliampere and by using 1 micron COOS technology, the latter value denoting the length of the channels of the transistors.

As far as the NMOS transistors T1 and T2 are concerned, the width of their channel is preferably chosen to be large enough for their conduction-mode gate/source voltage (and hence their conduction-mode drain/source voltage since the gate and the drain are linked) to remain below the threshold voltage of the source/substrate stray diffusion diode of each of these transistors. If this were not the case, some of the conduction current would flow via this diffusion diode, consequently reducing the efficiency of the rectifier.

In practice, the transistors are dimensioned in such a way as to obtain a gate/source voltage in conduction mode of less than 0.6 volts, it being possible to achieve this, with 0.5 micron CMOS technology, with channel widths of the order of from 300 to 500 microns for currents of the order of a milliampere.

Moreover, while each transistor T1 and T2 is conducting, the potential of its source becomes negative with respect to that of the substrate. The source/substrate diffusion diode is then forward-biased. Now, the threshold voltage VT of the transistor follows the physical law $$VT = VT0 + KB(\sqrt{VSB + 2\varnothing f} - \sqrt{2\varnothing f})$$

where VT0 designates the intrinsic threshold voltage of the transistor for a zero source/substrate voltage, VSB designates the source/substrate voltage, KB and 2 Øf being parameters given by the technology, (by way of example: VT0=0.65 volts, KB=0.7 2ØF=0.63 for 1 micron CMOS technology).

Accordingly, the value of the threshold voltage VT decreases while the transistor is conducting, thus favoring the flow of the current in the channel of the transistor to the detriment of the current in the source/substrate diffusion diode.

The person skilled in the art is aware that the substrate effect of a transistor, produced by a positive and non-zero value VSB, leads to an increase in the threshold voltage.

This substrate effect, which is at a maximum with regard to the diode-mounted transistors of U.S. Pat. No. 5,479,172 by virtue of the fact that their sources are linked to the positive output potential, are minimized in the rectifier according to the invention and may hence contribute to reducing the drop voltage.

Figure 3:
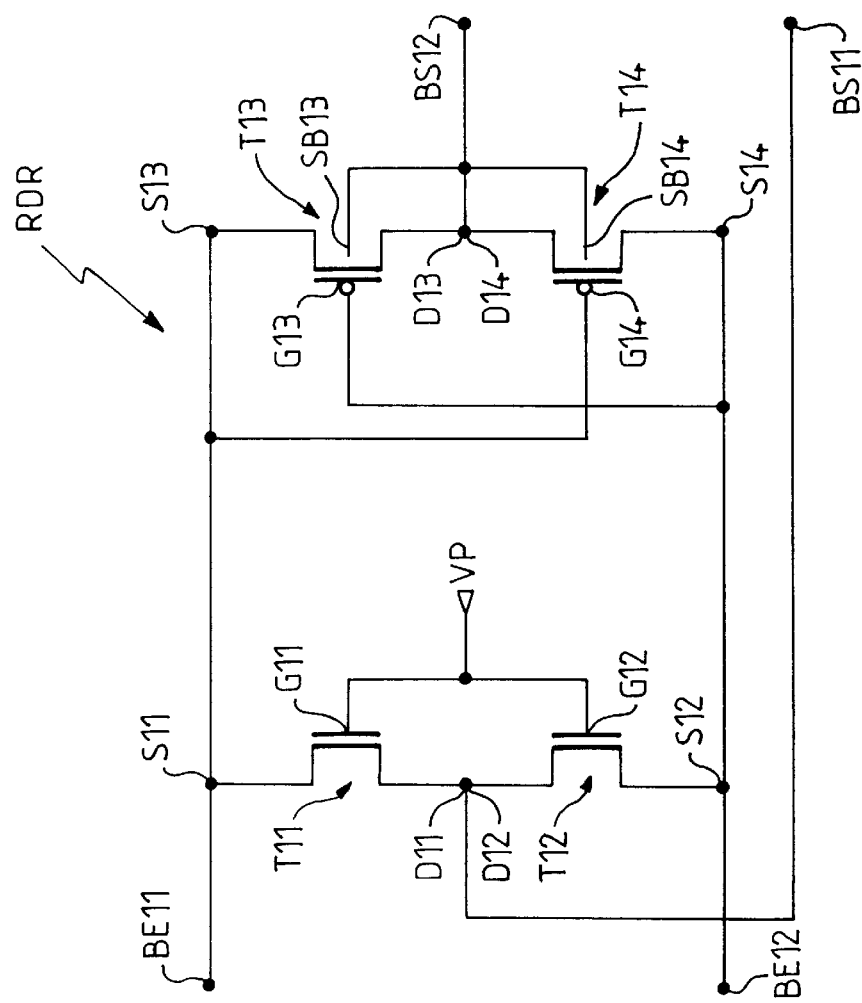

If the technology used does not make it possible to obtain gate/source voltages in conduction mode which are low enough for a reasonable width of the transistors, the person skilled in the art may be able to use the embodiment illustrated in FIG. 3.

In this FIG. 3, the elements which are analogous or have functions which are analogous to those described in FIGS. 1 and 2 have references whose digits have been increased by 10 as compared to those of FIGS. 1 and 2. Only the differences between this FIG. 3 and FIGS. 1 and 2 will be described now.

In FIG. 3, the two transistors T11 and T12 which are rectifier-connected now have their respective gates G11 and G12 linked to a chosen bias voltage VP, rather than being diode-connected in accordance with the diagram of FIG. 1. This bias voltage, which is subtracted from the threshold voltage of the transistors T11 and T12, will be chosen to be below the intrinsic threshold voltage VT0 of these transistors, so that the source/substrate voltage, that is to say in this instance the source/drain voltage for these transistors, in conduction mode remains below the threshold voltage of the source/substrate stray diffusion diode. Were the bias voltage of the gates of the transistors to exceed the threshold voltage VT0 of these transistors, the latter would not remain sufficiently blocked during the periods of nonconduction.

In practice, it may be possible to choose a bias voltage equal to a few hundred millivolts, typically 0.5 volts. This bias voltage may be taken out directly (if it is available) at the level of the other parts of the integrated circuit incorporating the rectifier. If this voltage is not available directly, it will be possible to provide a bias device such as that illustrated in FIG. 4.

Figure 4:
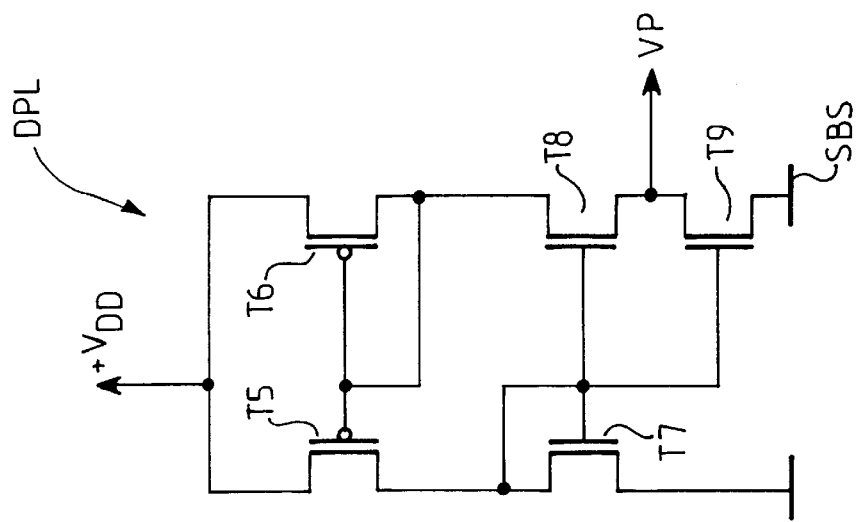
FIGS. 3 and 4 illustrate diagrammatically a second embodiment of a rectifier.

In this FIG. 4, the bias device DPL includes two PMOS transistors T5 and T6 whose sources are linked to the supply voltage+VDD. The gates of these two transistors are linked together. The gate of the transistor T6 is linked to the drain.

The drain of the transistor T5 is linked to the substrate via an NMOS transistor T7 whose gate is linked to the drain. The drain of the transistor T6 is linked to the substrate via two NMOS transistors T8 and T9, the drain of T9 being linked to the source of T8. The bias voltage VP is taken out at this common terminal.

The gates of the transistors T7 and T8 are linked together as are the gates of the transistors T7 and T9.

Comparative tests between the device according to the invention and the rectifier of the aforementioned U.S. patent have shown that for a sinusoidal AC input voltage of ±5 volts, a rectified voltage of around 3.3 volts was obtained with the rectifier of the prior art and a rectified voltage of around 4.2 volts was obtained with the rectifier according to the invention, this corresponding to a difference of 22% in favor of the rectifier according to the invention.

The foregoing description relates to devices which use P- or P-type-doped substrates. Of course, in the case of N- or N-type-doped substrates, the NMOS transistors should be replaced by PMOS transistors and vice versa, and the signs of the voltages and the directions of the diffusion diodes likewise should be reversed.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A voltage rectifying device comprising:
   two input terminals for an AC voltage;
   rectifying means made using integrated technology within a semiconductor substrate; and
   two output terminals for a rectified voltage, one of these output terminals being taken out at substrate level;
   wherein the rectifying means comprises:
      a pair of first insulated-gate field-effect transistors connected as diodes with one of their electrodes linked to the substrate; and
      a pair of second insulated-gate field-effect transistors arranged respectively in biased semiconductor wells with their gates linked to the two input terminals in a crossover geometry;
      wherein the first and second transistors comprise channels of opposite types and a drain/source voltage, when conducting, which is below a predetermined voltage.

2. The device of claim 1, wherein the first transistors have their drains linked to the substrate and their gates linked to their respective drains, and wherein their sources are linked to the two input terminals respectively.

3. The device of claim 1, wherein the width of the channels of the first transistors is at least equal to 300 microns.

4. The device of claim 2, wherein the width of the channels of the first transistors is at least equal to 300 microns.

5. The device of claim 1, wherein the wells of the second transistors are linked to the other output terminal.

6. The device of claim 1, wherein the predetermined voltage is taken equal to a threshold voltage of a diode.

7. The device of claim 1, wherein the predetermined voltage is taken equal to 0.6 volts.

8. The device of claim 1, wherein the first transistors are NMOS transistors, and wherein the second transistors are PMOS transistors.

9. The device of claim 1, wherein the device produces a rectified voltage of about 4 volts when an AC input voltage of about ±5 volts is applied to the input terminals.

10. The device of claim 1, wherein gate terminals of the pair of first insulated-gate field-effect transistors are linked together.

11. A voltage rectifying device comprising:
    two input terminals for an AC voltage;
    rectifying means made using integrated technology within a semiconductor substrate; and
    two output terminals for a rectified voltage, one of these output terminals being taken out at substrate level;
    wherein the rectifying means comprises:
       a pair of first insulated-gate field-effect transistors having one of their electrodes, drain or source, linked to the substrate and their gates linked to a chosen bias voltage; and
       a pair of second insulated-gate field-effect transistors arranged respectively in biased semiconductor wells with their gates linked to the two input terminals in a crossover geometry;
       wherein the first and second transistors comprise channels of opposite types and a drain/source voltage, when conducting, which is below a predetermined voltage.

12. The device of claim 11, wherein the first transistors have their drains linked to the substrate and their sources linked to the two input terminals respectively.

13. The device of claim 11, wherein the bias voltage is chosen to be below the intrinsic threshold voltage of each first transistor.

14. The device of claim 13, wherein the bias voltage is large enough to lower the drain/source voltage needed to make each transistor conducting, and wherein the bias voltage is enough below the intrinsic threshold voltage to allow blocking by each transistor during periods of nonconduction.

15. The device of claim 11, wherein the wells of the second transistors are linked to the other output terminal.

16. The device of claim 11, wherein the predetermined voltage is taken equal to a threshold voltage of a diode.

17. The device of claim 11, wherein the predetermined voltage is taken equal to 0.6 volts.

18. The device of claim 11, wherein the first transistors are NMOS transistors, and wherein the second transistors are PMOS transistors.

19. The device of claim 11, wherein the device produces a rectified voltage of about 4 volts when an AC input voltage of about ±5 volts is applied to the input terminals.

* * * * *